June 3, 1952 WEN YUAN PAN 2,598,935

INTERFERENCE-REDUCING SYSTEM

Filed Sept. 30, 1948 2 SHEETS—SHEET 1

INVENTOR
WEN YUAN PAN
BY Philip G. Cooper
ATTORNEY

June 3, 1952 WEN YUAN PAN 2,598,935

INTERFERENCE-REDUCING SYSTEM

Filed Sept. 30, 1948 2 SHEETS—SHEET 2

INVENTOR
WEN YUAN PAN
BY Philip Hooper
ATTORNEY

Patented June 3, 1952 2,598,935

UNITED STATES PATENT OFFICE 2,598,935

INTERFERENCE-REDUCING SYSTEM

Wen Yuan Pan, Collingswood, N. J., assignor to Radio Corporation of America, a corporation of Delaware Application September 30, 1948, Serial No. 51,974

7 Claims. (Cl. 250—20)

This invention relates to multi-band heterodyne type signal receiving apparatus and more particularly to such apparatus having novel interference-reducing features.

In the normal heterodyne type signal receivers such as radio receiving sets for use in homes, a signal-passing circuit is tuned to selectively pass incoming signal waves of a desired frequency while a wave-generating circuit is simultaneously tuned to cause the generation of mixer waves having a different frequency. The signal and mixer waves are heterodyned or mixed together to form beat signals within a predetermined or so-called intermediate frequency (IF) channel for amplification by a high-efficiency amplifying system having a fixed band-pass response. One important disadvantage of heterodyne receivers has been the response due to the heterodyning of the mixer waves with undesired so-called "image" signals having frequencies so related to those of the mixer waves that they also produce beat signals within the predetermined channel. This is especially marked where the image signals are of high intensity and are easily passed by the signal-passing circuit even though this circuit may be tuned to attenuate them.

Among the objects of the present invention is the provision of heterodyne type signal receivers having novel image-attenuating features.

Other objects of the invention include the provision of multi-band heterodyne type signal receivers in which the tuning elements of one band are utilized to attenuate image-frequency signals for another band.

A still further object of the invention is the provision of multi-band heterodyne type signal receivers in which tuning reactances for resonant circuits of different bands are, in the interest of simplicity, linked for simultaneous tuning whether or not the circuits are switched into receiving operation and advantage is taken of this simultaneous tuning over an unused band to selectively attenuate image signals in a signal-receiving band.

Figure 1:
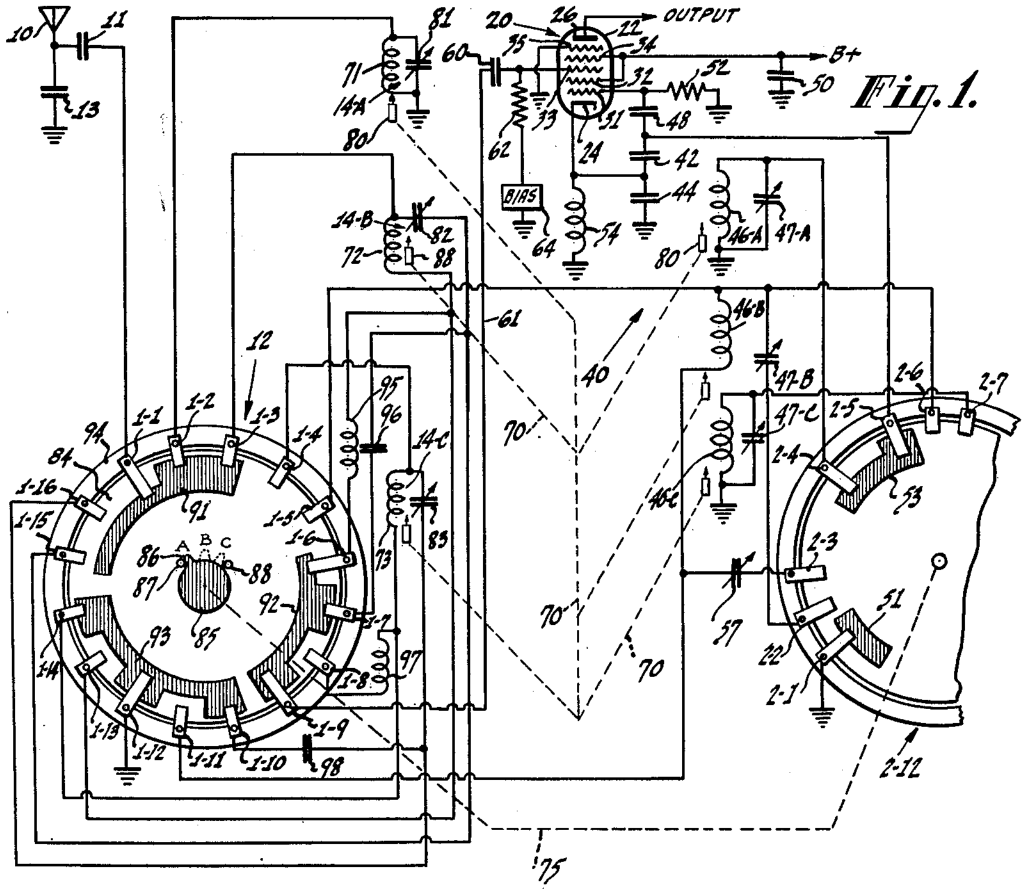
Figure 2:
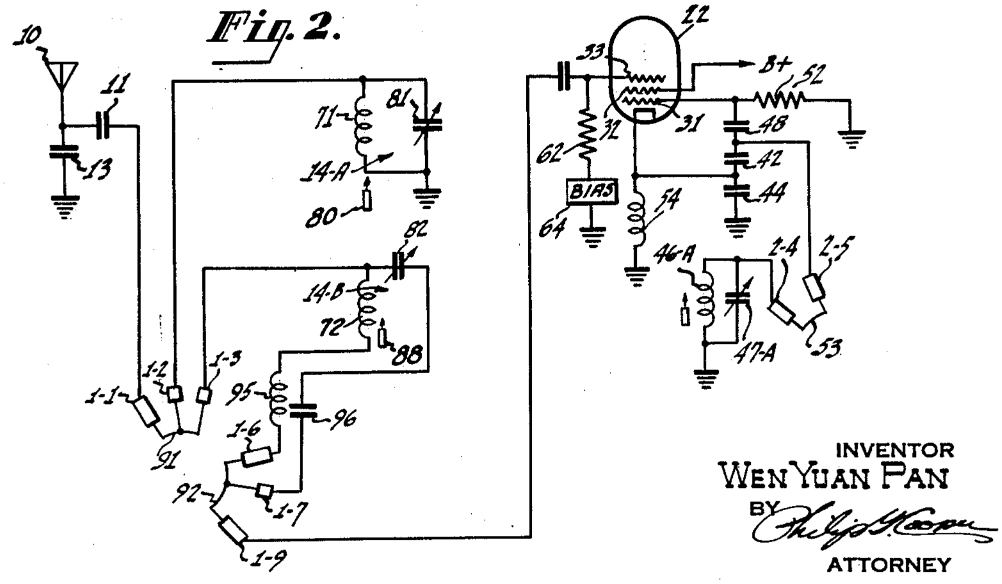
Figure 3:
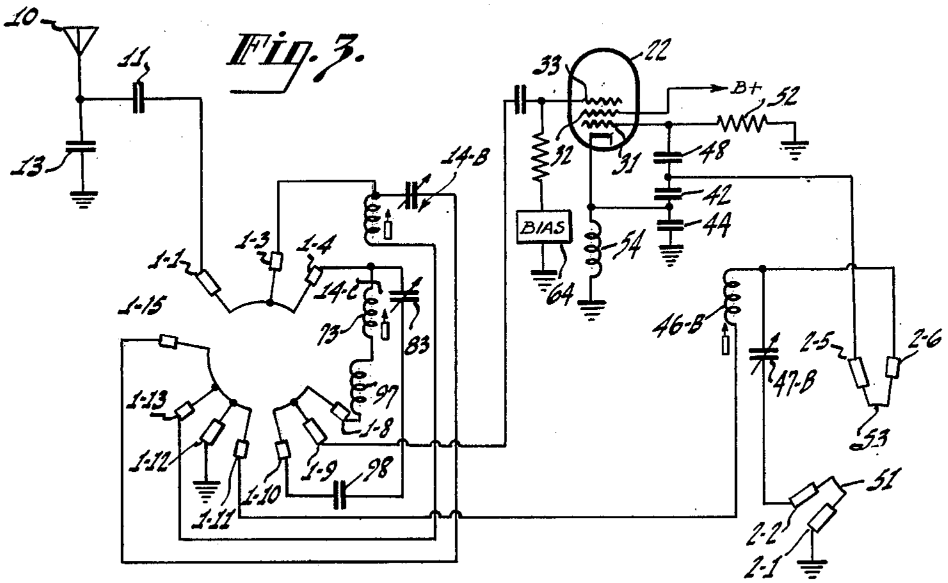
Figure 4:
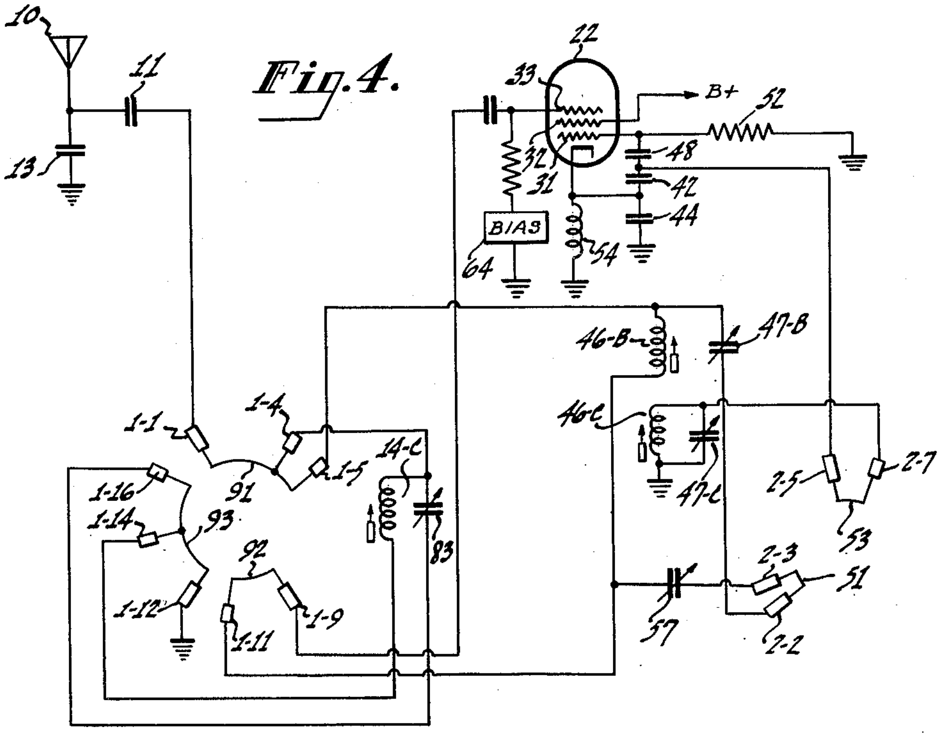

The above as well as other objects of the invention will be more readily understood from the following description of exemplifications thereof, reference being had to the accompanying drawings wherein:

Fig. 1 is a circuit diagram of a tuning section of a multi-band radio signal receiving apparatus illustrating one modification of the invention; and Figs. 2, 3 and 4 are circuit diagrams, with parts omitted, showing the essential details of the band-shifting arrangement of the construction of Fig. 1.

According to the invention, multi-band heterodyne type signal receivers having linked or ganged tunable reactance elements for the separate bands are provided with switching structure so connected that as the desired reactance elements are switched into the conventional receiving circuits, at least one other tunable reactance is switched to form a tuned image-attenuating network. By this technique, a signal receiving system can have its image rejection considerably increased at very little additional cost, and the increase can be effective over a wide tuning range.

Fig. 1 shows the circuit construction of one example of the tuner section in a radio signal-receiving system embodying the invention. An antenna 10 is arranged for coupling, by means of combination switch 12, with any desired one of a number of selective signal-passing circuits 14A, 14B and 14C. The switch 12 also connects the desired signal-passing circuit with the signal input of a mixer or heterodyne stage 20 which may be of any convenient type. In the form shown the mixer stage includes an electron-discharge pentagrid converter tube 22 having an electron-emissive cathode 24, an electron collecting plate 26 and five grids 31, 32, 33, 34 and 35 between the cathode and plate. The first grid 31 is connected as an oscillator grid by means of the wave-generating or oscillator network 40 including series capacitors 42, 44 which are shunted across a desired one of a number of variable inductors 46–A, 46–B, 46–C to form a parallel resonant oscillation-frequency-determining or "tank" circuit. Small adjustable capacitances 47–A, 47–B, 47–C are provided for connection across the respective inductors 46–A, 46–B and 46–C to fix their tuning ranges in relation to the signal selecting circuits. The tank circuit is connected at one end to the oscillator grid 31 by means of coupling capacitor 48 and at the other end to the grids 32 and 34 by means of the ground connection and the by-pass capacitor 50. A tap between the tank condensers 42, 44 is connected to the cathode 24. The necessary D.-C. electrode paths are established by an oscillator grid resistor 52, and cathode choke 54 both returning to ground. The grids 32, 34 which are normally operated at a relatively large positive D.-C. potential with respect to the cathode are effectively held at ground potential for A.-C. oscillations because of the by-pass capacitor 50, and in this combination, as is well known, oscillations will be developed in the oscillator tank and will appear on the oscillator grid 31.

Grid 33 is connected as the signal input grid and is led to the signal selecting and passing circuit through a blocking capacitor 60 and tube input lead 61. The D.-C. return for grid 33 is provided by resistor 62 which may be connected to a D.-C. reference potential source, for example directly to ground or to the source of bias potential 64, such as a conventional automatic volume control circuit for establishing the bias voltage between the grid and cathode and thereby controlling the effect of the signal grid on the converting action of the tube 22.

Grid 35 is shown as merely connected to the cathode 24 for improving the electron flow between cathode and plate. The positive potential for grids 32, 34 may be supplied by a D.-C. source, not shown, the positive lead to which is represented by the B+ sign, the negative lead being grounded.

With the above arrangement, when there is applied to the plate 26 a potential which is positive with respect to the cathode 24, varying signals appearing on the signal grid 33 and oscillations at the oscillator grid 31 will both affect the electron flow in tube 22 and cause the electron flow to vary in accordance with the frequency of the signal variations and the oscillations as well as beats, or sums and differences of these frequencies and their harmonics. By inserting in the lead to plate 26, a load impedance tuned to a specific frequency there will appear across the load the desired amplified beat or heterodyne signal at those frequencies. The recovered signals may be utilized in any conventional manner as by coupling the load to the input of further amplifiers, in manners well known to those skilled in the art.

The selective circuits 14–A, 14–B, 14–C are shown as parallel resonant circuits including respectively variable inductors 71, 72, 73 and capacitors 81, 82, 83. The signal-selective inductors 71, 72, 73 as well as the wave-generating inductors 46–A, 46–B, 46–C are shown as arranged to have their inductance values varied by means of movable high permeability magnetic tuning members 80 placed in the magnetic field space of the individual inductors. One practical inductance-varying arrangement is produced by forming the magnetic members 80 as cores which are movably mounted so as to penetrate to varying extents within the turns of the windings that form the corresponding inductors.

For simplicity of construction the magnetic tuning members 80 are linked or ganged together, as indicated by the dash lines 70 so that all the variable inductances are simultaneously varied regardless of which particular band is selected for signal reception. This is provided by a simple construction in which all the tuning members 80 are held on a single control unit for simultaneous movement. Thus no complicated shifting of tuning member linkages is needed as the apparatus is switched to the different bands.

For assuring that tuning of the oscillation frequency faithfully tracks the tuning of the signal-passing circuit, so that the heterodyne signals stay in a fixed channel, the magnetic members have their relative positions adjustable or pre-set. The capacitances 47–A, 47–B, 47–C are also adjusted for accurately aligning the oscillator ranges with those of the associated signal bands.

Combination switch 12 includes a set of contact strips 91, 92, 93 held on a centrally pivoted non-conductive disc 84 and engageable with a set of contacts 1—1 to 1—16 by rotation of a band selector knob 85, fixed to the disc 84, as by means of a common shaft (not shown). A stationary portion of the apparatus may include frequency band legends shown as A, B and C and the knob may include a pointer 86 to indicate the specific band for which the switch is set. Stops 87, 88 provide the desired limits for the movement of the switch.

The contacts 1—1 to 1—16 are all secured to a fixed non-conductive wafer 94 and project to different extents in the path of their corresponding contact strip which is shaped to make the proper contact engagements. Contact 1—1 is connected to the antenna through coupling capacitor 11. Another capacitor 13 provides an impedance connection from the antenna lead to ground and is selected for cooperating with capacitor 11 to form an impedance matching coupling between the antenna and the signal input of the converter stage 20.

Contacts 1—2, 1—3 and 1—4 are connected to the high potential ends of the selective signal circuits 14–A, 14–B and 14–C respectively. The low potential end of circuit 14–A is grounded, whereas the other circuits 14–B and 14–C have their inductors and capacitors separately connected at their low potential ends to contacts 1—13, 1—15 and 1—14, 1—16 respectively. Through additional reactance elements 95, 96, 97, 98 the low potential ends of these inductors and capacitors are also separately connected to contacts 1—6, 1—7, 1—8 and 1—10 respectively.

Oscillator inductor 46–B has its upper and lower ends connected to contacts 1—5 and 1—11 respectively. Contact 1—9 is the signal input lead for converter stage 20 and contact 1—12 is the common signal return shown as a ground connection.

Another switch assembly 2—12, which may be constructed similarly to the switch combination 12, is provided with a pair of movable contact strips 51, 53 and separate sets of fixed contacts 2—1 to 2—7. Contact 2—1 is grounded while contacts 2—2 and 2—7 are connected to the upper end of oscillator inductance 46–B, and contact 2—3 is connected through capacitor 57 to the lower end of this inductance. The upper ends of inductances 46–A and 46–C are separately led to contacts 2—4 and 2—7 respectively. Contact 2—5 establishes the oscillator tank connection between the tank capacitors 42, 44 and the selected tank inductance.

In the form of the invention shown, switches 12 and 2—12 are ganged as by mechanical link 75. The contact strips are so shaped and the contacts of such length, that the following operation is effected:

In the position in which the switches are illustrated in Fig. 1, the apparatus is set for reception in the "A" band. The circuit connections established by the switches are more clearly shown in simplified Fig. 2. Antenna supply contact 1—1 is connected to ground across tuning circuit 14–A by means of contact strip 91 and contact 1—2. At the same time contact strip 91 with contacts 1—1, and 1—3, together with contact strip 92 and contacts 1—6, 1—7 and 1—9 establish an image attenuating tuned parallel-resonant circuit consisting of inductances 72, 95 and capacitors 82, 96, in series with the signal supply to the tube input lead 61. Contact strip 53 by means of contacts 2—4, 2—5 inserts A-band oscillator inductance 46–A into the oscillator tank circuit. The grounding action of contact strip 93 is not needed in this condition and may be ignored. Parallel-resonant circuit 14–B consisting of inductance 72 and capacitance 82, is normally tunable over the "B" band of signals to be received but the added connection of inductance 95 and capacitance 96 alters the circuit by adjusting its tuning range to that of the undesired images of the "A" band. In this example the A-band oscillator tank 42, 44, 46–A is adjusted to generate waves uniformly higher in frequency than the signals passed by "A" band circuit 14–A so that the converter output is in a substantially constant frequency channel corresponding to this difference in frequency. With such operation, the undesired image signals are higher in frequency than the generated waves, by the same amount that the generated waves are higher than the desired signals. Additionally the frequency range of the undesired image signal is smaller than the frequency range of the "A" band itself. In those constructions in which the different signal bands are tuned to cover approximately the same number of octaves, the range of tuned circuit 14–B would have to be diminished to follow the desired signal tuning of circuit 14–A and provide the desired image attenuation. The addition of inductance 95, which is not tuned with the inductance gang, acts to minimize the inductance changes of inductance 72. Where the undesired image spectrum for "A" band tuning is not coincident with the minimized tuning range of inductances 72, 95 and the connected capacitance 82, the image tuning range is shifted as by the addition of capacitance 96. As an example of the A-band operation, and without limiting the invention in any way, the following constants are given:

A-band signal range, 540 to 1720 kilocycles per second.
A-band oscillator tuning range, 995 to 2175 kilocycles per second.
Image interference with A band, 1450 to 2630 kilocycles per second.
Converter output (IF center frequency), 455 kilocycles per second.
B-band signal range, 2.25 to 7.3 megacycles per second.

Inductance 95 and capacitance 96 are adjusted to make the entire image-attenuating circuit tune to the range of image frequencies. It will be seen that the elements 72, 82, 95, 96 form a parallel-resonant circuit which will present a high impedance to the passage of image signals to the converter input regardless of the portion of the band being tuned in. The desired signals which are at frequencies spaced from the images by twice the oscillator frequency, is passed substantially unhindered by the image-attenuating network.

For receiving signals in the "B" band, the switches 12 and 2—12 are merely rotated one step in the clockwise direction as by manually turning knob 85 till the indicator 86 points to the legend "B." The contact strips 91, 92, 93, 51 and 53 are thereby shifted to establish the circuits as shown in Fig. 3. Strip 91 which remains in engagement with its long antenna contact 1—1 becomes disconnected from contact 1—2, retains connection with contact 1—3 and becomes additionally connected with contact 1—4. Strip 92 simultaneously disengages the converted input contact 1—9 from contact 1—6 and 1—7 and connects it instead with contacts 1—8 and 1—10. Strip 93 meanwhile grounds contacts 1—11, 1—13 and 1—15. The lower end of adjusting capacitor 47–B also becomes grounded, through strip 51, and strip 53 shifts the connection of oscillator tank contact 2—5 to contact 2—6.

As a result of the above circuit changes, tuned circuit 14–B has its lower ends grounded and its upper end connected to antenna coupling condenser 11, while the capacitance 83 and variable inductance 73 of circuit 14–C become connected together with adjusting reactances 97, 98 in series with the input lead 61. At the same time oscillator inductance 46–B as well as its trimmer capacitance 46–B, have their lower ends grounded and upper ends connected in the oscillator tank circuit. Accordingly incoming signals will now be selected by tuning of circuit 14–B while images attenuation will be simultaneously tuned by the combination of reactances 73, 83, 97, 98.

For reception of signals in the "C" band, the switches are rotated another step in the clockwise direction, bringing indicator 86 to the legend "C" and the circuits to the condition shown more clearly in Fig. 4. The antenna thereby becomes connected to contacts 1—4, 1—5, by strip 91 while the lower ends of reactances 73, 83 are grounded by strip 93 to provide the signal-selecting circuit. Image attenuation is established by the connection of oscillator windings 46–B, between contacts 1—5 and 1—11, in series with the input lead 61 to the antenna. The capacitance 57 is selected to move the tuning range of inductance 46–B to the desired image-rejection region. Oscillator tuning is provided by the connection of windings 14–C in the oscillator tank circuit through contacts 2—5 and 2—7.

It will be found, when the desired signal range in one band is suitably adjusted with respect to the intermediate frequency as well as the signal range of another band, that the tunable oscillator tank reactance for one band will have a reactance range suitable for directly tracking with the image signals of the other band, even when both bands have the same tuning range ratio. Thus, for example, and not by way of limitation, with the intermediate frequency 455 kilocycles per second, ranges may be selected as follows:

| Band | Signal tuning | | Oscillator tuning | | Image | |
|---|---|---|---|---|---|---|
| | Range mc./second | Ratio | Range mc./second | Ratio | Range mc./second | Ratio |
| 1 | 2.25– 7.3 | 3.2 | 2.705– 7.755 | 2.89 | | |
| 2 | 7.2 –22.5 | 3.1 | 7.655–22.955 | | 8.11–23.41 | 2.89 |

It is noted in the above example that band 1 oscillator has a tuning ratio about the same as the image tuning ratio of band 2. By merely adjusting its untuned reactance to the proper value the tuning range of band 1 oscillator can be made to exactly follow the image frequency range of bands. Bands 1 or 2 of the second example given may or may not be the same bands as those identified as "A" and "B" of the earlier example.

In the construction of Fig. 1 the resonant circuit inductances are tuned so that the capacitance across the oscillator windings are adjusted for image rejection. In many cases the distributed capacity inherent in the windings 46-B can be adjusted to the proper value for the desired image attenuation so that merely disconnecting these windings from the oscillator tank circuit will suffice to place them in image following condition. With such a constution capacitor 57 and its associated contact may be omitted. Also, the trimmer capacitor 47-B may be permanently connected across inductance 46-B and the entire switching of contact strip 51 eliminated.

If desired the image attenuation for band "C" may be provided by one of the other tuned circuits such as the "A" or "B" band signal selecting circuit 14-A or 14-B. When the "B" band oscillator is tuned to frequencies higher than the "B" band signals, its tuning range is closest to the image frequencies of the higher band so that the reactance elements of this oscillator are more closely suited to efficient image attenuation for these very high frequency images. However, where the oscillator for a band is tuned to generate waves having frequencies below the signal frequencies, the signal-selective circuit rather than the oscillator circuit of this band is slightly better suited for the rejection of images of higher frequency bands. This is generally applicable because even adjacent bands usually have a spacing larger than two times the oscillator frequency. Correspondingly for image attenuation with respect to signals in bands of lower frequency, a higher band resonant circuit having the lowest tuning range is generally more effective.

A feature of the invention is the simplicity of construction. Inasmuch as all the resonant circuits are arranged for tuning whether or not they are switched into operation, the construction of the invention only requires the addition of a few fixed adjusting reactances and suitable switching connections, all of which is relatively inexpensive. The added adjusting reactances need not be variable since accurate tracking in the image rejection circuit is not necessary. Also with oscillators operating at the high frequency side of the signal-selecting circuit, the image range ratio is much lower than the signal range and is adequately covered even with appreciable misalignment. This can be readily seen from the A-band data given above. If desired however, variable adjusting reactances may be used, as for example when the intermediate frequency is much lower than the signal frequency and the image range ratio is almost as large as that of the signal range. See the data for band 2, for example.

In those receiver constructions having permeability tuning of resonant circuit inductances, it is normally the practice to provide separately tuned inductances for each resonant circuit and gang the tuning together. This is exactly the manner suited for the invention.

It is obvious that the switching arrangement may be varied in many respects from that shown in the figure. For example different kinds of switches may be employed; each contact strip may be embodied in a separate ganged switch, all the contact strips may be on a single rotary assembly such as that indicated at 12 having the necessary increased number of contacts, the strips may be grouped in different combinations, etc. Additionally the antenna coupling arrangement need not be of the type shown but may be of the transformer or coupled-coil form in which the tuned circuits 14-A, 14-B, 14-C are associated with magnetically coupled primary windings for connection directly between antenna and ground. If desired autotransformer antenna couplings may also be utilized and have the advantage of a simplicity approaching that of the construction illustrated.

The adjusting reactances of the invention that are switched into resonant circuits for tracking to images may be permanently connected in parallel as an independent adjusting circuit having two terminals. This type of adjusting circuit may be used with simpler switching inasmuch as one of its terminals may be kept permanently connected to the corresponding signal-selecting circuit so that only the other terminal has to have its connection shifted. The corresponding signal-selecting reactances may also be permanently connected as a parallel circuit with two terminals. According to this modification which can be formed from the construction of Fig. 1 by merely permanently interconnecting the low potential side of the reactive elements of the signal-selecting circuit 14-B for example, the signal-selecting circuit may have its high potential terminal connected to a switch contact, such as 1—3 for example, and its low potential terminal connected with one terminal of a two-terminal adjusting circuit, to a grounding contact such as 1—12. The second terminal of the adjusting circuit is arranged to be selectably connected to the mixer input lead such as the one shown at 1—9. Only three switch contacts are accordingly needed to shift this type of circuit combination instead of the five required in the construction of Fig. 1. The effect of the extra connection or the operation of the circuit combination is negligible.

As a further modification of the invention, the adjusting reactances may also be connected to decrease the resonant circuit inductance and/or increase the resonant circuit capacitance. Where desired this is readily accomplished by connecting the adjusting inductance in parallel with the original inductance, and the adjusting capacitance in parallel with the original capacitance.

The invention is also not confined to the specific oscillator and/or mixing circuit shown but may be used with any convenient arrangement.

While several exemplifications of the invention have been indicated and described above, it will be apparent to those skilled in the art that other modifications may be made without departing from the scope of the invention as set forth in the appended claims.

What is claimed is:

1. In a multi-band heterodyne signal receiving apparatus, an interference reducing system including band change switching means having a plurality of contacts, tunable reactance elements for each of said bands connected to said contacts, mechanically coupled tuning means for each of said elements for providing unicontrol tuning, heterodyne means connected to said contacts, a first circuit including certain of said contacts for selectively connecting said heterodyne means with said tunable reactance elements of one of said bands, and a second circuit including certain others of said contacts for selectively connecting another of said tunable reactance elements serially in said first circuit.

2. In a multi-band heterodyne signal receiving apparatus, an interference reducing system including band change switching means having a plurality of contacts, radio frequency tuned circuits for each of said bands connected to said contacts, oscillator tuned circuits for each of said bands connected to said contacts, a heterodyne means connected to said contacts, a first circuit including certain of said contacts for selectively connecting said heterodyne means with said oscillator tuned circuit of one of said bands, a second circuit including certain other of said contacts for selectively connecting said radio frequency tuned circuits of the same band with said heterodyne means, and a third circuit including certain further of said contacts for selectively connecting another of said radio frequency tuned circuits serially in said second circuit.

3. In a multi-band heterodyne signal receiving apparatus, an interference reducing system including band change switching means having a plurality of contacts, input radio frequency tuned circuits for each of said bands tunable over a predetermined range and connected to said contacts, oscillator tuned circuits for each of said bands tunable at a substantially constant frequency difference above said radio frequency tuned circuits and connected to said contacts, a heterodyne means connected to said contacts, a first circuit including certain of said contacts for selectively connecting said heterodyne means with said oscillator tuned circuit of one of said bands, a second circuit including certain other of said contacts for selectively connecting said input radio frequency tuned circuit of the same band with said heterodyne means, and a third circuit including certain further of said contacts for selectively connecting another of said oscillator tuned circuits tunable to a frequency above said radio frequency tuned circuit equal to two times said first named frequency difference serially in said second circuit.

4. In a multi-band heterodyne signal receiving apparatus, an interference reducing system including band change switching means having a plurality of contacts, radio frequency tuned circuits for each of said bands connected to said contacts, oscillator tuned circuits for each of said bands connected to said contacts, a converter stage connected to said contacts, a first circuit including certain of said contacts for selectively connecting said converter stage with said oscillator tuned circuit for one of said bands and tunable to a predetermined frequency range, a second circuit including certain other of said contacts for connecting said radio frequency tuned circuit of the same band and tunable to a frequency range at a substantially constant difference frequency below said predetermined frequency with said converter stage, and a third circuit including certain further of said contacts for selectively connecting another of said radio frequency tuned circuits tunable to a frequency range at a substantially constant difference frequency above said predetermined frequency equal to said first named difference frequency serially in said second circuit thereby providing an image rejection circuit.

5. Multi-band heterodyne signal receiving apparatus as defined in claim 4 wherein said serially connected radio frequency tuned circuit comprises an inductive branch and a capacitive branch connected in parallel and said third circuit comprises an additional inductance connected serially in said inductive branch and an additional capacitor connected serially in said capacitive branch whereby tracking of said image rejection circuit is provided throughout the entire band spectrum.

6. In a multi-band heterodyne signal receiving apparatus, an interference reducing system including band change switching means having a plurality of contacts, gang-tuned radio frequency circuits for each of said bands connected to said contacts, oscillator tuned circuits for each of said bands connected to said contacts, mechanically coupled tuned means for said oscillator circuit ganged with the tuning means of said radio frequency tuned circuits, a mixer stage connected to said contacts, a first circuit including certain of said contacts connected to said mixer stage and said oscillator tuned circuits for connecting said oscillator tuned circuit of one of said bands tunable to a predetermined frequency range to said mixer stage, a second circuit including certain other of said contacts connected to said gang-tuned radio frequency circuits and said mixer stage for connecting one of said gang-tuned radio frequency tuned circuits of the same band tunable at a substantially constant frequency difference below said predetermined frequency range to said mixer stage, and a third circuit including certain further of said contacts and another of said oscillator tuned circuits tunable at a substantially constant frequency difference above said predetermined frequency range equal to said first named frequency difference connected serially in said second circuit thereby providing an image rejection circuit.

7. Multi-band heterodyne signal receiving apparatus as defined in claim 6 wherein said serially connected oscillator tuned circuit comprises an inductive branch and a capacitive branch connected in parallel, and said third circuit comprises an additional inductance connected serially in said inductive branch and an additional capacitor connected serially in said capacitive branch whereby tracking of the image rejection circuit throughout the entire band spectrum is maintained.

WEN YUAN PAN.

REFERENCES CITED

The following references are of record in the file of this patent:

UNITED STATES PATENTS

| Number | Name | Date |
|---|---|---|
| 1,895,809 | Macnabb | Jan. 31, 1933 |
| 1,896,065 | Budenbom | Feb. 7, 1933 |
| 2,026,075 | Wheeler | Dec. 31, 1935 |
| 2,137,266 | Case | Nov. 22, 1938 |
| 2,201,938 | Albright | May 21, 1940 |
| 2,281,661 | Barton | May 5, 1942 |